F. Z. HICKOX.
GRATE.

No. 176,529. Patented April 25, 1876.

WITNESSES:
H. Rydquist.
John Goethals

INVENTOR:
F. Z. Hickox
BY
[signature]
ATTORNEYS.

UNITED STATES PATENT OFFICE.

FRANCIS Z. HICKOX, OF UTICA, NEW YORK, ASSIGNOR OF ONE-THIRD HIS RIGHT TO MICHAEL SMITH AND ONE-THIRD TO JOHN MILLS, OF SAME PLACE.

IMPROVEMENT IN GRATES.

Specification forming part of Letters Patent No. 176,529, dated April 25, 1876; application filed April 4, 1876.

*To all whom it may concern:*

Be it known that I, FRANCIS Z. HICKOX, of Utica, Oneida county, New York, have invented a new and Improved Grate for Stoves, Furnaces, &c., of which the following is a specification:

My invention is a shaker or stirrer, consisting of a frame fixed to slide forward and backward on vertically-inclined ways under the grate, and having teeth projecting up into the fire between the bars, so as to have a forward-and-backward and up-and-down raking-action, calculated to be very efficient in cleaning the fire, the said stirrer being worked by a lever.

Figure 1:
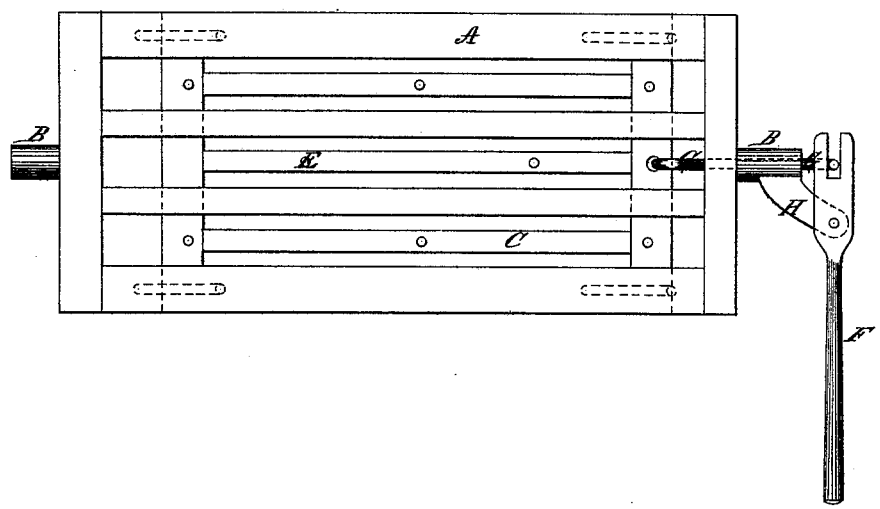
Figure 2:
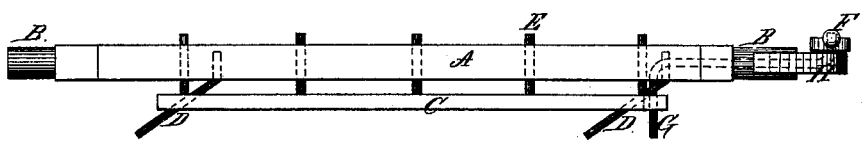

Figure 1 is a plan view of my improved grate, and Fig. 2 is a side elevation.

Similar letters of reference indicate corresponding parts.

A represents the grate, which is fixed on trunnions B, or may be arranged in any other approved way, for dumping. C represents the reciprocating frame, mounted under the grate on the vertically-inclined ways D, for sliding forward, and upward and down, and having teeth E extending up into the fire-bed, between the bars of the grate, to rake the fire when worked by a lever, F, or any other equivalent device, the lever being in this case connected to the frame by the bent rod G passing through one of the trunnions of the grate, and the lever is pivoted on an arm, H, attached to the trunnion, so that the whole vibrates together.

Having thus described my invention, I claim as new and desire to secure by Letters Patent—

1. The combination of a raking-shaker, C E, mounted on inclined ways D, with a fire-grate, substantially as specified.

2. The lever for working the shaker, pivoted on one of the trunnions of the grate, and connected to the shaker by a rod extending through the trunnion, substantially as specified.

FRANCIS Z. HICKOX.

Witnesses:
P. BULGER,
MICHAEL SMITH.